US010055579B2

United States Patent
Striem-Amit

(10) Patent No.: US 10,055,579 B2
(45) Date of Patent: Aug. 21, 2018

(54) SYSTEM RESOURCES FOR SANDBOXING

(71) Applicant: Cybereason Inc., Boston, MA (US)

(72) Inventor: Yonatan Striem-Amit, Somerville, MA (US)

(73) Assignee: Cybereason, Inc., Boston, MA (US)

( * ) Notice: Subject to any disclaimer, the term of this patent is extended or adjusted under 35 U.S.C. 154(b) by 0 days.

(21) Appl. No.: 15/395,299

(22) Filed: Dec. 30, 2016

(65) Prior Publication Data

US 2017/0193223 A1    Jul. 6, 2017

Related U.S. Application Data

(60) Provisional application No. 62/273,854, filed on Dec. 31, 2015, provisional application No. 62/273,823, filed on Dec. 31, 2015.

(51) Int. Cl.
*G06F 21/53* (2013.01)
*G06F 9/455* (2018.01)

(52) U.S. Cl.
CPC .......... *G06F 21/53* (2013.01); *G06F 9/45533* (2013.01); *G06F 2221/033* (2013.01)

(58) Field of Classification Search
CPC . G06F 21/53; G06F 9/45533; G06F 2221/033
See application file for complete search history.

(56) References Cited

U.S. PATENT DOCUMENTS

| | | | | |
|---|---|---|---|---|
| 8,239,557 B2 * | 8/2012 | McCune | ............... | G06F 9/5077 709/223 |
| 8,832,829 B2 * | 9/2014 | Manni | ................... | G06F 21/566 726/22 |
| 9,519,779 B2 * | 12/2016 | Ghosh | ..................... | G06F 21/56 |
| 9,628,498 B1 * | 4/2017 | Aziz | .................... | H04L 63/1408 |
| 9,692,773 B1 * | 6/2017 | Watson | ............... | H04L 63/1416 |
| 2013/0047149 A1 * | 2/2013 | Xu | ............................ | G06F 8/61 717/175 |
| 2015/0278513 A1 * | 10/2015 | Krasin | .................. | G06F 9/5005 726/30 |
| 2016/0021142 A1 * | 1/2016 | Gafni | .................. | H04L 63/1425 726/23 |
| 2016/0080414 A1 * | 3/2016 | Kolton | ............... | H04L 63/1491 726/23 |

(Continued)

OTHER PUBLICATIONS

FireEye Press Release, FireEye Delivers Next-Generation Threat Protection Platform, Feb. 25, 2013, http://investors.fireeye.com/releasedetail.cfm?ReleaseID=790792.

(Continued)

*Primary Examiner* — Matthew Smithers
(74) *Attorney, Agent, or Firm* — Robert Greenspoon; Flachsbart & Greenspoon LLC

(57) ABSTRACT

A method, computer program product, and apparatus for implementing a distributed sandbox is disclosed. The method comprises discovering a machine with sufficient resources to run a virtual machine for a process, starting the process in a virtual machine on the discovered machine, if the virtual machine terminates, discovering another machine with sufficient resources to run a virtual machine for a process, and deciding if the process is benign when the virtual machine is finished. Control of the distributed sandbox is done by utilizing a broadcast network.

28 Claims, 8 Drawing Sheets

(56) References Cited

U.S. PATENT DOCUMENTS

2016/0212154 A1* 7/2016 Bobritsky ............... G06F 21/56
2016/0259939 A1* 9/2016 Bobritsky ............. G06F 21/566
2017/0111374 A1* 4/2017 Harris ................... H04L 63/145

OTHER PUBLICATIONS

Palo Alto Networks, "At a Glance Wildfire", 2016, https://www.paloaltonetworks.com/content/dam/pan/en_US/assets/pdf/faqs/at-a-glance-wildfire.pdf.
David P. Anderson et al.,"SET1@home: An Experiment in Public-Resource Computing", Space Sciences Laboratory, Communications of the ACM, vol. 45 No. 11,Nov. 2002, pp. 56-61.
Dilshan Keragala, "Detecting Malware and Sandbox Evasion Techniques", SANS Institute InfoSec Reading Room, Jan. 16, 2016.
Thomas Blasing et al"An Android Application Sandbox System for Suspicious Software Detection", Nov. 2010, 5th International Conference on Malicious and Unwanted Software.
Michael Mimoso, "Malware Evasion Techniques Dissected at Black Hat", threatpost, Jul. 26, 2013.
MOSIX operating system, https://en.wikipedia.org/wiki/MOSIX.

\* cited by examiner

SYSTEM RESOURCES FOR SANDBOXING

This application claims the benefit of U.S. Provisional Application No. 62/273,854, filed Dec. 31, 2015, the entire disclosure of which is herein incorporated by reference. This application claims the benefit of U.S. Provisional Application No. 62/273,823, filed Dec. 31, 2015, the entire disclosure of which is herein incorporated by reference.

TECHNICAL FIELD OF THE INVENTION

The present invention relates to computer security, and more specifically to distributed sandboxes and system resources for sandboxing.

BACKGROUND OF THE INVENTION

Sandboxing is the process of attempting to discover unknown or adverse effects of programs or other activities on a computer. Sandboxing is quite popular as a method of securing or ameliorating computer systems from an adversary who attempts to compromise the machines.

There are many types of sandboxes which range from sandboxes which run on a machine or within a program (e.g. Java) to dedicated machines such as the FireEye MVX engine, which uses a Virtual Machine (VM) which requires relatively high end dedicated machines. Refer to FIG. 6, which shows an architecture diagram of the FireEye MVX system 600, including multi-vector virtual execution (MVX) engines 602a-j. FIG. 6 is an illustration in "FireEye Delivers Next-Generation Threat Protection Platform", Feb. 25, 2013, available at http://investors.fireeye.com/releasedetail.cfm?ReleaseID=790792 (last accessed Dec. 30, 2016).

However, all current methods of sandboxing suffer from limited resources. Since simulating program activity is resource intensive (requiring memory, disk space, CPU cycles, etc.) sandboxes are generally limited in what they can achieve. For example, if a malicious program waits for a sufficiently long time period before activating it can run undetected. Of course, if the program never exits the sandbox (such as is the case for Java) this is not an issue. However, attempts to completely sandbox the operating system activities have been heretofore unsuccessful and therefore, a sandboxed process will generally be let outside the sandbox where it can do harm.

Some sandboxes are in the cloud, for example Palo-Alto's Wildfire. For these types of sandboxes, the resources are more flexible inasmuch as they can respond to demand. However, these resources are taken from a generic pool of resources and do not use the resources currently available in the enterprise. In addition, such a localized, distributed sandbox also ensures that the test environment is most matching to the target environment in which the attack occurs. FIG. 7 shows the Palo-Alto Wildfire architecture 700 including the threat intelligence cloud 702. FIG. 7 is an illustration in "At a Glance Wildfire", Palo Alto Networks, 2016, available at https://www.paloaltonetworks.com/content/dam/pan/en_US/assets/pdf/faqs/at-a-glance-wildfire.pdf (last accessed Dec. 30, 2016).

In parallel to the burgeoning field of sandboxing, there has been work done on utilizing idle resources in computer networks. For example, the SETI@home project allows PC owners to run signal processing algorithms on their home PC. FIG. 8 shows the distribution of data 800 in the SETI@home system. There are many other projects that use idle computers to run desired programs. FIG. 8 is an illustration in David P. Anderson et al., "SETI@home: An Experiment in Public-Resource Computing", Space Sciences Laboratory, U.C. Berkeley, available at https://setiathome.berkeley.edu/sah_papers/cacm.php (last accessed Dec. 30, 2016).

Another way of doing computation is to use so-called cloud computing. Cloud computing allows the use of remote resources to do desired computation. One particular type of cloud computing is often called private cloud computing in which the organization owns a set of computers that are available to users in that organization.

Generally, the private cloud is comprised of dedicated computers. However, it is technically possible to use idle or underutilized computers to run desired programs. Of course, it is desirable to be able to rapidly change the programs that are running on a machine. One way of doing this is to utilize a VM to run on the private cloud.

While all current sandboxing require dedicated machines, these machines actually run a virtual machine for each of the processes. Thus, it is possible to use the private cloud (or other computers) to distribute the sandbox. Thus it is possible to run the sandbox utilizing the idle cycles on the distributed machine which are not required to be dedicated to use as a sandbox machine. The use of non-dedicated machines reduces cost and increases available resources.

One advantage of using production machines to run sandboxing is that the environment will more closely relate to the actual environment which is being protected and thus most malware evasion techniques will not work. See, e.g., Dilshan Keragala, "Detecting Malware and Sandbox Evasion Techniques", SANS Institute InfoSec Reading Room, available at https://www.sans.org/reading-room/whitepapers/forensics/detecting-malware-sandbox-evasion-techniques-36667 (last accessed Dec. 30, 2016).

Common evasion techniques which can be prevented by using production machines include but are not limited to: mouse interaction, detection of humans, real environment, online digital signature, etc.

However, there are several drawbacks with this method. The first drawback is that when using idle cycles a VM may need to be terminated before the desired level of measurements for the process is completely achieved. This can be ameliorated, e.g., by using multiple machines in parallel or by starting a new VM on a new computer after the first process is terminated.

Starting a new process requires additional computer cycles which is generally not an issue. However, using conventional sandboxing starting a new process can cause unacceptable delays to running the program on the actual desired computer.

Sideboxing is the process by which the sandboxing is done in parallel to the actual run on the computer. Thus sideboxing is particularly suited for this method.

SUMMARY OF THE INVENTION

The present invention developed by Cybereason is a technique in which the speed of discovery is traded off for accuracy. For example, (perceived) attacks on a single computer can be ignored in exchange for increasing accuracy of detection of attacks that attack multiple computers. Thus in the paradigm of Cybereason, the cost of starting a new process upon unexpected termination of a VM running is negligible since it merely slows up detection.

The idea is that given a set of machines which can run a VM, is to run a sandbox on the best machine to use. In practice, this will be determined based on a set of considerations. For example, the average load on nearby machines, the probability of early termination on a given machine, the speed of copying a program/data, the peak load on machines are all important considerations.

Another aspect is control and reporting of distributed sandboxing. For a distributed sandbox a centralized server can be used if desired. However, this server does not require the power of the current sandbox machines since it is just used for control as opposed to actual running of programs.

DETAILED DESCRIPTION OF INVENTION

Embodiments of the invention will be described below. The invention is not limited to these particular embodiments. The claims control the invention.

It is possible to run a completely distributed control of the distributed sandbox. For instance, a broadcast network can be used in which idle machines $404a$-$n$ listen to a channel 406 and accept responsibility for running a given virtual machine (VM). When the task is completed (or terminated) the machine can report to the channel. It is also possible for machines running VM to ping every time period so that other machines know that they are still working.

A peer to peer gossip network can be used in which each node knows a limited number of other nodes and search is done for a machine that has excess capacity. Such networks can be constructed, e.g., over the BitTorrent protocol.

Figure 1:
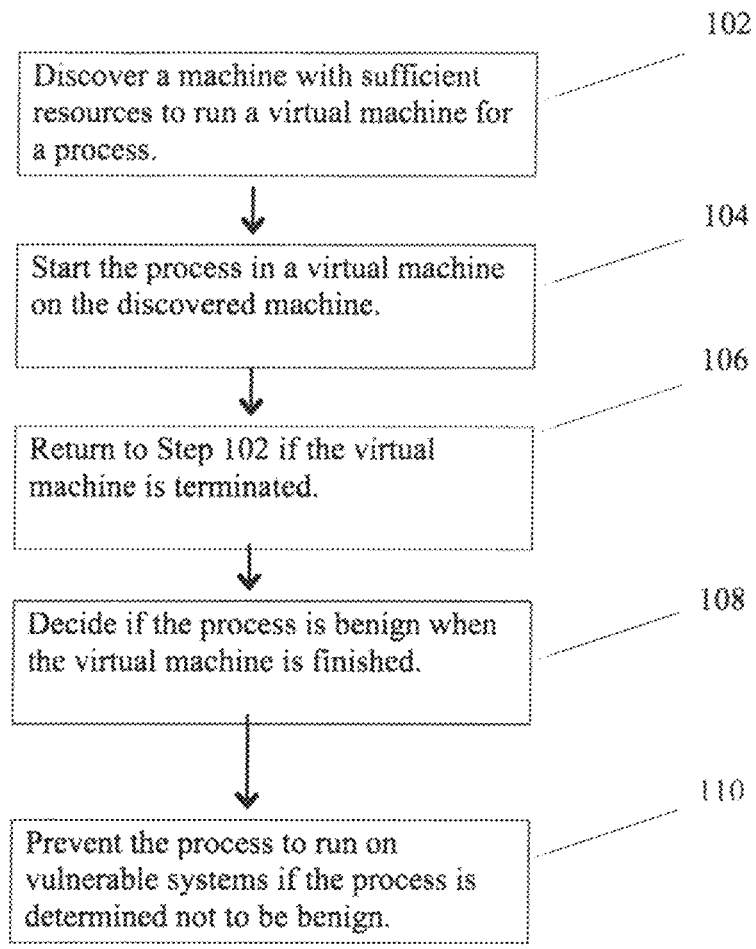
FIG. 1 is a flowchart of steps in a method for distributed sandboxing.

FIG. 1 is a flowchart of steps in a method for distributed sandboxing. The steps for using a distributed sandbox are:
1. Discover a machine with sufficient resources to run a VM for a process (Step 102).
2. Start the process in a virtual machine on the located resource (Step 104).
3. (Optionally) if the VM is terminated return to 1 (Step 106).
4. When the VM is finished, decide if the process is benign (Step 108).

Conventionally, a sandbox provides a tightly controlled and monitored set of resources in which a program can be run and tested. If a program attempts to deviate from allowed parameters, it will be prevented from running on vulnerable systems (Step 110). There are variants on sandboxing such as sideboxing in which a program is run in parallel on a sandbox while being allowed to run on a vulnerable system. When using sideboxing, if an attack is detected in the sandbox it can be then mitigated in the vulnerable system. While sideboxing increases the risk, it prevents the associated slowdown with sandboxing. Steps 108 and 110 are standard steps and appear, e.g., in "An Android Application Sandbox System for Suspicious Software Detection" by Thomas Biasing et al, published in the 2010 5th International Conference on Malicious and Unwanted Software, available at http://www.cs.uml.edu/~xinwenfu/Classes/91.661.201/MobilePhoneSecurityPapers/An%20Android%20Application%20Sandbox%20Systerm%20for%20Suspicious%20Software%20 Detection.PDF (last accessed Dec. 30, 2016).

One core assumption of sandbox technology is that symptoms of the attack will occur relatively early in the process. Since sandboxing is ultimately a simulation of the actual environment in which the program will run evasion techniques such as waiting a sufficiently long time to outlast the sandbox will often result in an attack slipping past a sandbox defense. Waiting can be done in many methods, for example, a malware can simply calculate a complex value or demand sufficient computational resources to outlast the ability and resources of the sandbox (e.g., break an RSA key of predetermined length).

There are other methods of evading sandboxes. Numerous samples from different malware families have demonstrated cunning ways to evade detection, for example, refusing to execute if it detects that it's being opened inside a virtual machine, or determining whether a remote desktop protocol connection is being used to look at code. Others will sleep for a defined period of time before executing, waiting perhaps to detect mouse movements to ensure that a human is at the wheel, and not some automated code scanner (See Michael Mimoso, "Malware Evasion Techniques Dissected at Black Hat", threatpost, available at http://threatpost.com/malware-evasion-techniques-dissected-at-black-hat/101504) (last accessed Dec. 30, 2016)).

There is little doubt that the war between malware detection such as sandbox technology and the ability of malware to avoid detection is only going to escalate.

Thus there is a need for methods to prevent evasion of attacks of sandbox detection methods. Such evasion techniques include: waiting for human interaction, waiting enough time, demanding a large amount of resources etc.

No matter what evasion technique is used, in order to compromise a system, the adversary must at some point take some action. This action can vary widely and can include compromising data, privilege escalation, unauthorized replication or other activities.

The core technique of the present invention is to utilize program migration. Program migration is a classic technique in which a running program is moved from one computer to another. For example the MOSIX operating system (http://en.wikipedia.org/wiki/MOSIX) (last accessed Dec. 30, 2016) migrates processes between computers in order to ensure load-balancing and improved performance. It is worthwhile noting that MOSIX2 can run as a virtual machine (VM) over various operating systems including Windows. In addition, the migration is hard for a running program to detect.

Figure 2:
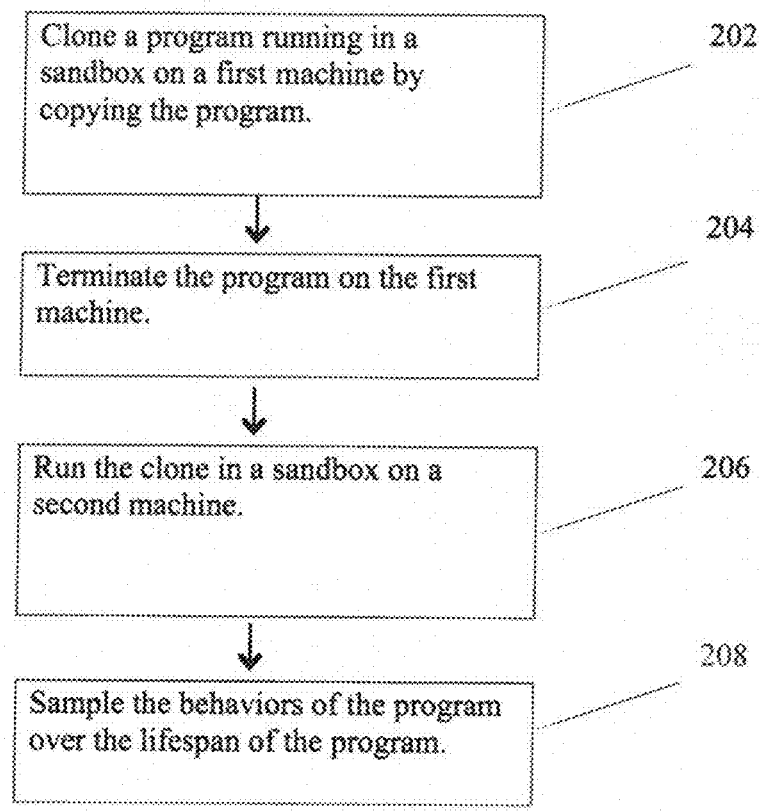
FIG. 2 is a flowchart of steps in a method for preventing evasion of a sandbox detection method by migrating a program.

Of course, the program should not actually be migrated. This is because migration moves the program from one machine to another. Rather, what should be done is to clone the program in which the program is run on two machines. FIG. 2 is a flowchart of steps in a method for preventing evasion of a sandbox detection method by migrating a program. Conceptually, migration consists of a cloning step (in which the program is copied) (Step 202) and a second step in which the program is terminated on the first machine (Step 204). Step 206 is to run the clone in a sandbox on a second machine. One advantage of cloning as opposed to migration is that it requires less coordination and handoff between the two machines.

Cloning can be utilized in order to make sandbox evasion harder. Since cloning can take place over the entire lifecycle of the program, if an adversary takes malicious action before cloning it can be detected. For example, deterministically clone every X time periods or clone with some probability p every X time. In addition, various differences in the system can be utilized in between cloning. Such differences include only cloning sleeping processes, cloning processes which are using relatively low memory or other temporal or inherent features of the program.

If for example, if into/out-of a sandboxed machine/VM is cloned the idea is to observe the activities of the program while it is migrated into the sandboxed machine. While this does not provide continuous observation of the program's activities throughout the entire running time of the program it does make it much harder to evade detection since the malicious signals cannot appear during any time which the program is migrated to the sandbox where it is under intensive observation.

Conventional sandboxing suffers from the limitation that it can only be used at the beginning of the running of the program. However, cloning the program to the sandbox at different intervals means that behaviors over the lifespan of the program can be sampled (Step 208).

One embodiment of the algorithm depicted in FIG. 2 is given by the following pseudocode:
  daemon sleeps;
  when daemon awakes, it clones process and sends a copy to sandbox; and
  daemon chooses a random time and sleeps with that time.
Another embodiment of the algorithm depicted in FIG. 2 is given by the following pseudocode:
  daemon runs in background; and
  when daemon detects that a condition is filled such as an excessive use of memory, exceeds runtime, interaction with suspect files or an IP, etc., daemon clones process and sends copy to sandbox.

In addition cloning can be done with more than one program. For instance if it is suspected that interactions of two programs have undesired behavior, pairs of programs can be cloned into the sandbox. Note that currently, if the attack requires two (or more) programs to come to fruition and the programs enter the system at different times, the current sandbox without cloning will not be able to detect the malicious activity.

In fact the ability to look for interactions between multiple programs is novel and has important implications for many uses.

Figure 3:
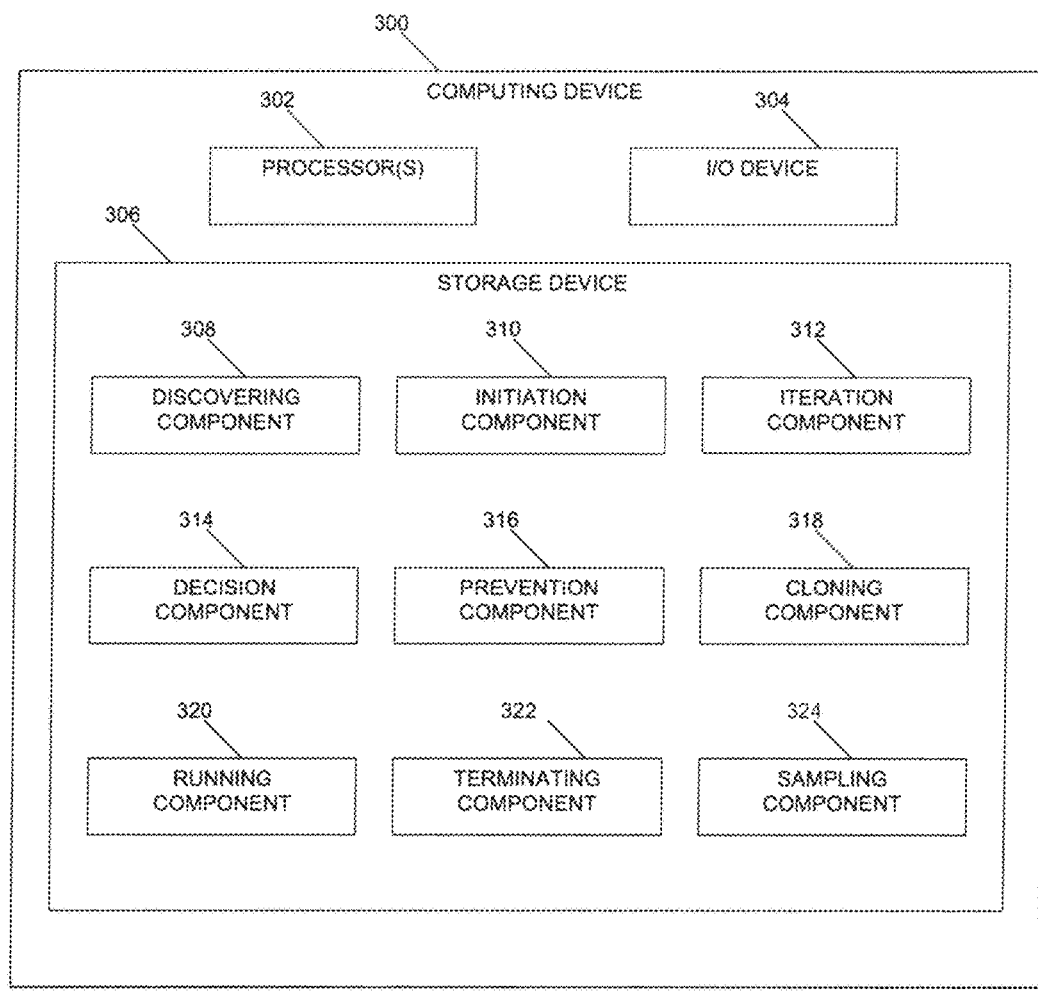
FIG. 3 is a block diagram of components in a computing device for implementing the invention in accordance with the disclosed embodiments.

FIG. 3 is a block diagram of components in a computing device for implementing a distributed sandbox and for preventing evasion of a sandbox detection method by migrating a program, in accordance with some exemplary embodiments of the disclosed subject matter. The invention may be implemented as one or more computing devices such as computing device 300, which may comprise one or more processors 302. Any of processors 302 may be a Central Processing Unit (CPU), a microprocessor, an electronic circuit, an Integrated Circuit (IC) or the like. Alternatively, computing device 300 can be implemented as firmware written for or ported to a specific processor such as a digital signal processor (DSP) or microcontrollers, or can be implemented as hardware or configurable hardware such as a field programmable gate array (FPGA) or application specific integrated circuit (ASIC). Processors 302 may be utilized to perform computations required by computing device 300 or any of its subcomponents.

In some embodiments, computing device 300 may comprise or be in communication with one or more input-output (I/O) devices 304 such as a terminal, a display for displaying an image, speakers, a microphone or another audio I/O device or the like, a keyboard, a touch screen, an I/O device used for recognizing a person or interacting with the system, or the like.

Computing device 300 may comprise one or more storage devices 306 for storing executable components. Storage device 306 may also contain data during execution of one or more components. Storage device 306 may be persistent or volatile. For example, storage device 306 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 306 may retain program code operative to cause any of processors 302 to perform acts associated with any of the steps shown in FIGS. 1 and 2, for example discovering a machine with sufficient resources to run a virtual machine for a process, cloning a program running in a sandbox on a first machine by copying the program, or the like.

The components detailed below may be implemented as one or more sets of interrelated computer instructions, executed for example by any of processors 302 or by another processor. The components may be arranged as one or more executable files, dynamic libraries, static libraries, methods, functions, services, or the like, programmed in any programming language and under any computing environment. Storage device 306 may comprise or be loaded with one or more of the components, which can be executed on computing platform 300 by any one or more of processors 302. Alternatively, any of the executable components may be executed on any other computing device which may be in direct or indirect communication with computing platform 300.

Storage device 306 may comprise a discovering component 308 for discovering a machine with sufficient resources to run a virtual machine for a process; an initiation component 310 for starting the process in a virtual machine on the discovered machine; an iteration component 312 for returning to Step 102 (of FIG. 1), and invoking the discovering component 308 if the virtual machine is terminated; a decision component 314 for deciding if the process is benign when the virtual machine is finished; and a prevention component 316 for preventing the process to run on vulnerable systems if the process is determined not to be benign in Step 108 (of FIG. 1) during invocation of the decision component 314.

Storage device 306 may comprise a cloning component 318 for cloning a program running in a sandbox on a first machine by copying the program; a running component 320 for running the clone in a sandbox on a second machine; a terminating component 322 for terminating the program on the first machine; and a sampling component 324 for sampling the behaviors of the program over the lifespan of the program.

Figure 4:
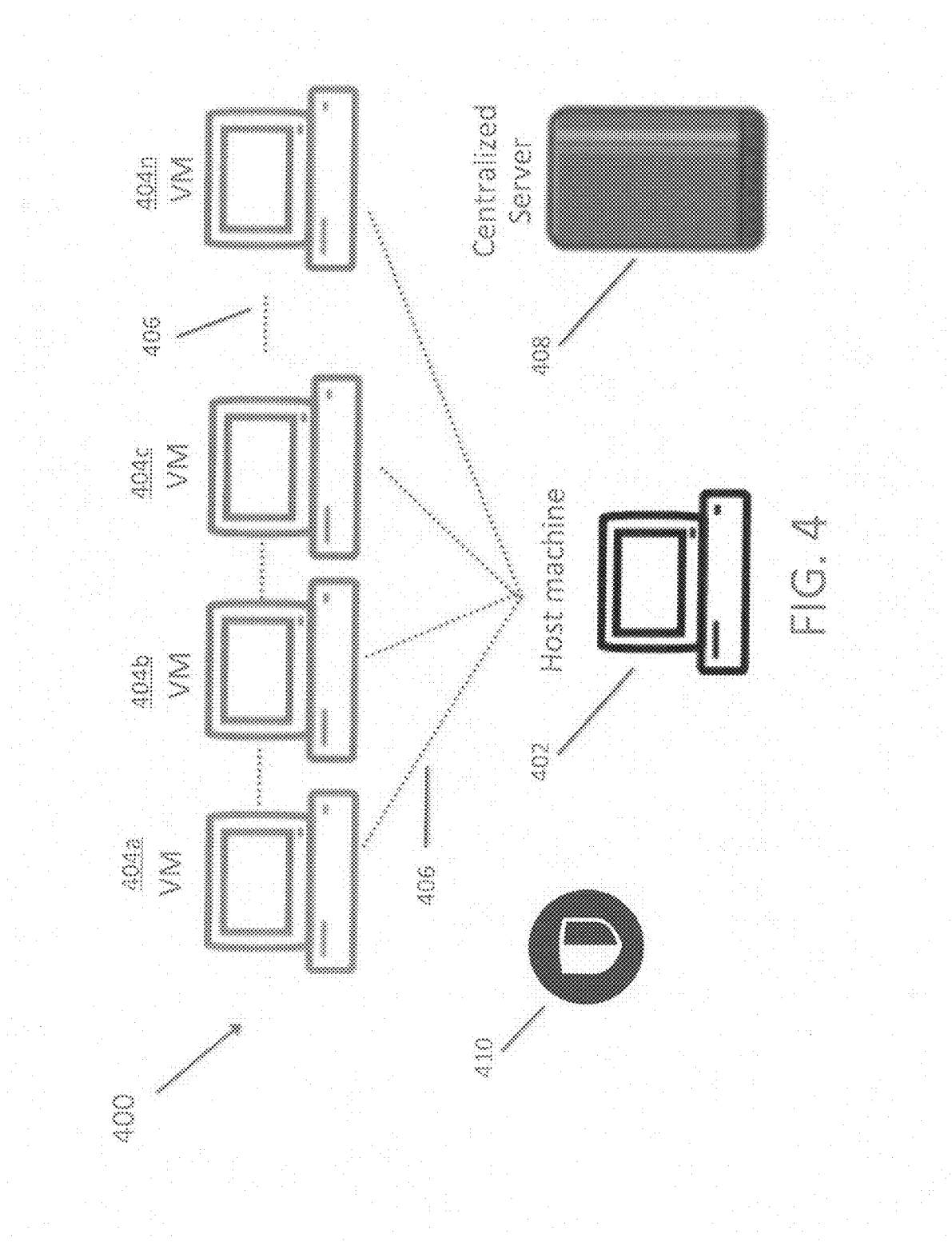
FIG. 4 is an architecture diagram illustrating distributed sandboxing.

FIG. 4 is an architecture diagram illustrating a system 400 for implementing a distributed sandbox. The system consists of host machine 402, several virtual machines 404a-c, . . . , to 404n, channel 406 and centralized server 408. Module 410 implements the algorithm depicted in FIG. 1. Control of the distributed sandbox 400 is done by utilizing a broadcast network in which idle virtual machines 404a-404n listen to a channel 406 (to which all VMs have access) and accept responsibility for running a given virtual machine. The centralized server 408 is used for control and reporting of the distributed sandbox 400.

Figure 5:
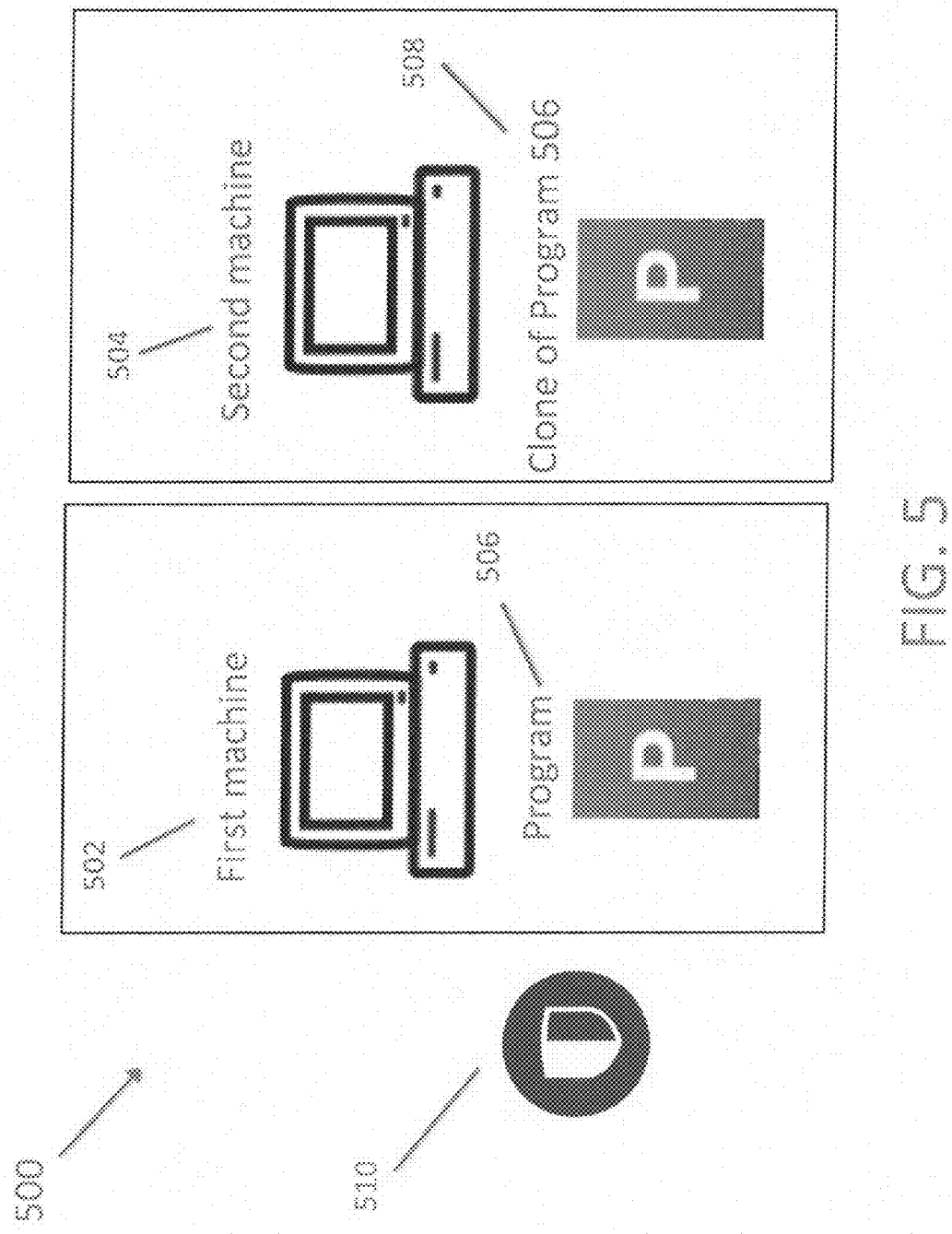
FIG. 5 is an architecture diagram illustrating preventing evasion of a sandbox detection method by migrating a program.
Figure 6:
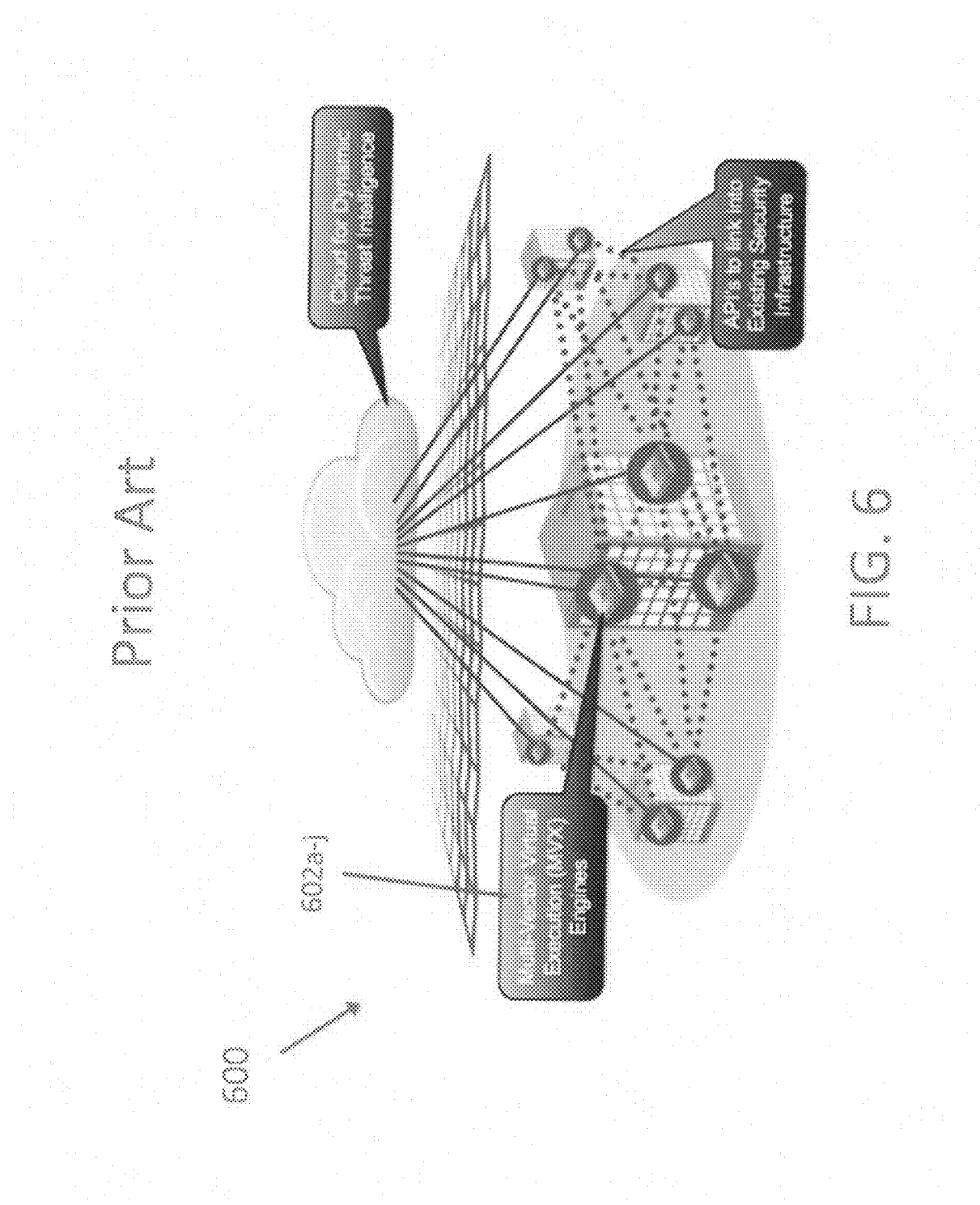
FIG. 6 is a prior art architecture diagram.
Figure 7:
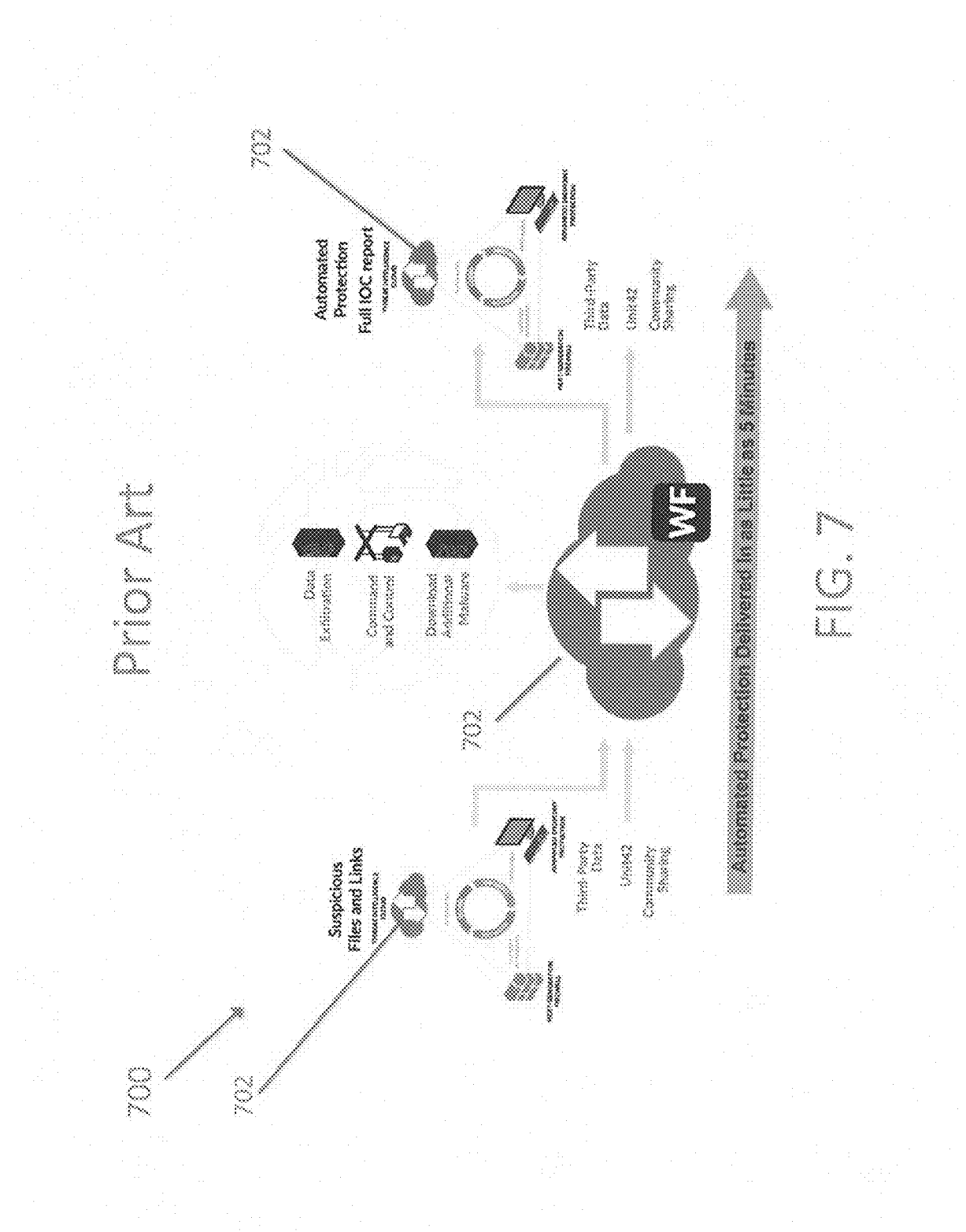
FIG. 7 is another prior art architecture diagram.
Figure 8:
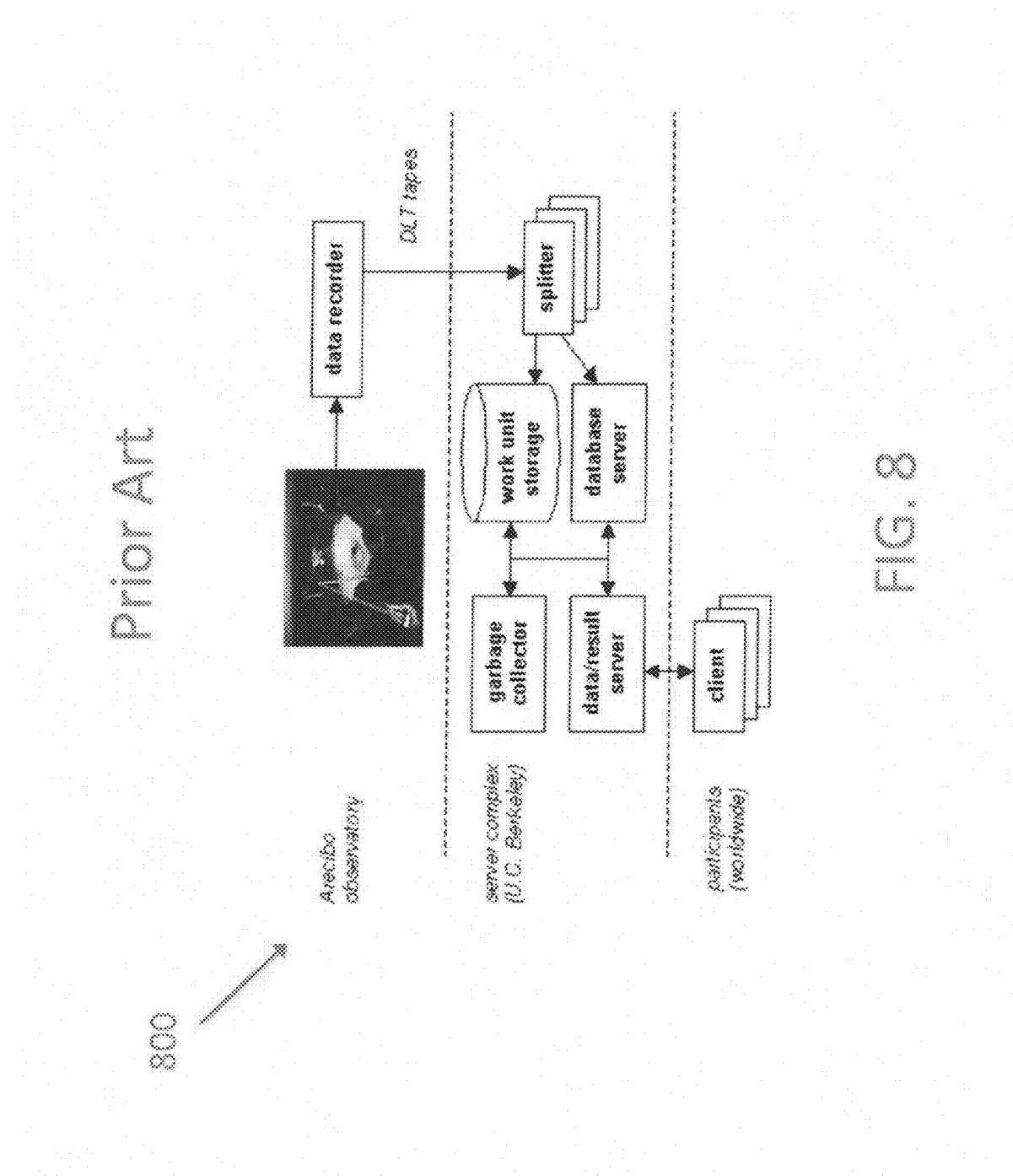
FIG. 8 is another prior art architecture diagram.

FIG. 5 is an architecture diagram illustrating preventing evasion of a sandbox detection method by migrating a program. Program 506 is running in a sandbox on a first machine 502. Program 506 is cloned as Program 508, which runs on a second machine 504. Module 510 implements the algorithm depicted in FIG. 2, including sampling the behaviors of the program over the lifespan of the program.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like, conventional procedural programming languages, such as the "C" programming language or similar programming languages, scripting languages such as Perl, Python, Ruby, or any other programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While the above specification and examples provide a description of the invention, many embodiments of the invention can be made without departing from the spirit and scope of the invention. It is to be understood that the foregoing embodiments are provided as illustrative only, and do not limit or define the scope of the invention. Various other embodiments are also within the scope of the claims.

What is claimed is:

1. A method for implementing a distributed sandbox, comprising the steps of:
   (A) discovering a machine with sufficient resources to run a virtual machine for a process;
   (B) starting the process in a virtual machine on the discovered machine;
   (C) returning to (A) if the virtual machine is terminated; and
   (D) deciding if the process is benign when the virtual machine is finished;
   wherein the process is run in parallel on a sandbox while being allowed to run on a vulnerable system, thereby preventing an associated slowdown with sandboxing.

2. The method of claim 1, wherein control of the distributed sandbox is done by utilizing a broadcast network in which idle machines listen to a channel and accept responsibility for running a given virtual machine.

3. The method of claim 1, wherein virtual machines periodically ping so that other machines know that they are still working.

4. The method of claim 1, wherein the discovering step (A) is done by locating a machine with excess capacity using a peer to peer gossip protocol in which each node knows a limited number of other nodes.

5. The method of claim 1, wherein a centralized server is used for control and reporting of the distributed sandbox.

6. The method of claim 1, wherein the discovering step (A) is done using the BitTorrent protocol.

7. The method of claim 1, further comprising the step of preventing the process to run on vulnerable systems if the process is determined not to be benign in step (D).

8. The method of claim 1, wherein if an attack is detected in the sandbox it is then mitigated in the vulnerable system.

9. The method of claim 1, wherein the virtual machine is selected based on the average load on nearby machines, the probability of early termination on a given machine, the speed of copying a program/data, or the peak load on machines.

10. A computer program product for implementing a distributed sandbox on a computer, comprising:
    a non-transitory computer readable medium;
    a first program instruction for (A) discovering a machine with sufficient resources to run a virtual machine for a process;
    a second program instruction for (B) starting the process in a virtual machine on the discovered machine;
    a third program instruction for (C) returning to (A) if the virtual machine is terminated;
    a fourth program instruction for (D) deciding if the process is benign when the virtual machine is finished;
    wherein the process is run in parallel on a sandbox while being allowed to run on a vulnerable system, thereby preventing an associated slowdown with sandboxing; and
    wherein said first, second, third, and fourth program instructions are stored on said non-transitory computer readable medium.

11. The computer program product of claim 10, wherein control of the distributed sandbox is done by utilizing a broadcast network in which idle machines listen to a channel and accept responsibility for running a given virtual machine.

12. The computer program product of claim 10, wherein virtual machines periodically ping so that other machines know that they are still working.

13. The computer program product of claim 10, wherein the discovering step (A) is done by locating a machine with excess capacity using a peer to peer gossip protocol in which each node knows a limited number of other nodes.

14. The computer program product of claim 10, further comprising a fifth program instruction for preventing the process to run on vulnerable systems if the process is determined not to be benign in step (D).

15. An apparatus having a processing unit and a storage device, the apparatus comprising:
- a discovering component for (A) discovering a machine with sufficient resources to run a virtual machine for a process;
- an initiation component for (B) starting the process in a virtual machine on the discovered machine;
- an iteration component for (C) returning to (A) if the virtual machine is terminated; and
- a decision component for (D) deciding if the process is benign when the virtual machine is finished;
- wherein the process is run in parallel on a sandbox while being allowed to run on a vulnerable system, thereby preventing an associated slowdown with sandboxing.

16. The apparatus of claim 15, wherein control of the distributed sandbox is done by utilizing a broadcast network in which idle machines listen to a channel and accept responsibility for running a given virtual machine.

17. The apparatus of claim 15, wherein virtual machines periodically ping so that other machines know that they are still working.

18. The apparatus of claim 15, wherein the discovering step (A) is done by locating a machine with excess capacity using a peer to peer gossip protocol in which each node knows a limited number of other nodes.

19. The apparatus of claim 15, further comprising a prevention component for preventing the process to run on vulnerable systems if the process is determined not to be benign in step (D).

20. A method for implementing a distributed sandbox, comprising the steps of:
- (A) discovering a machine with sufficient resources to run a virtual machine for a process;
- (B) starting the process in a virtual machine on the discovered machine;
- (C) returning to (A) if the virtual machine is terminated; and
- (D) deciding if the process is benign when the virtual machine is finished;
- wherein the virtual machine is selected based on the average load on nearby machines, the probability of early termination on a given machine, the speed of copying a program/data, or the peak load on machines.

21. The method of claim 20, wherein control of the distributed sandbox is done by utilizing a broadcast network in which idle machines listen to a channel and accept responsibility for running a given virtual machine.

22. The method of claim 20, wherein virtual machines periodically ping so that other machines know that they are still working.

23. The method of claim 20, wherein the discovering step (A) is done by locating a machine with excess capacity using a peer to peer gossip protocol in which each node knows a limited number of other nodes.

24. The method of claim 20, wherein a centralized server is used for control and reporting of the distributed sandbox.

25. The method of claim 20, wherein the discovering step (A) is done using the BitTorrent protocol.

26. The method of claim 20, further comprising the step of preventing the process to run on vulnerable systems if the process is determined not to be benign in step (D).

27. The method of claim 20, wherein the process is run in parallel on a sandbox while being allowed to run on a vulnerable system, thereby preventing an associated slowdown with sandboxing.

28. The method of claim 27, wherein if an attack is detected in the sandbox it is then mitigated in the vulnerable system.

* * * * *